H. I. GOSLINE.
FREEZING ATTACHMENT FOR MICROTOMES.
APPLICATION FILED NOV. 23, 1916.

1,343,051. Patented June 8, 1920.

Witness
C. P. Beall.

Inventor
H. I. Gosline.
By
Attorney

UNITED STATES PATENT OFFICE.

HAROLD I. GOSLINE, OF WORCESTER, MASSACHUSETTS.

FREEZING ATTACHMENT FOR MICROTOMES.

1,343,051.　　　　　Specification of Letters Patent.　　Patented June 8, 1920.

Application filed November 23, 1916. Serial No. 132,990.

*To all whom it may concern:*

Be it known that I, HAROLD I. GOSLINE, a citizen of the United States, residing at Worcester, in the county of Worcester and State of Massachusetts, have invented certain new and useful Improvements in Freezing Attachments for Microtomes; and I do hereby declare the following to be a full, clear, and exact description of the invention, such as will enable others skilled in the art to which it appertains to make and use the same.

This invention has for its object to provide an improved freezing attachment for microtomes and other surgical appliances by which large pieces of tissue such as whole brain sections may be quickly and uniformly frozen.

Figure 1:
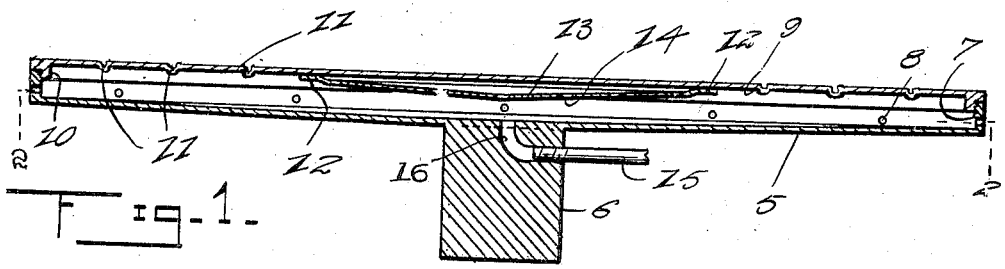
Figure 2:
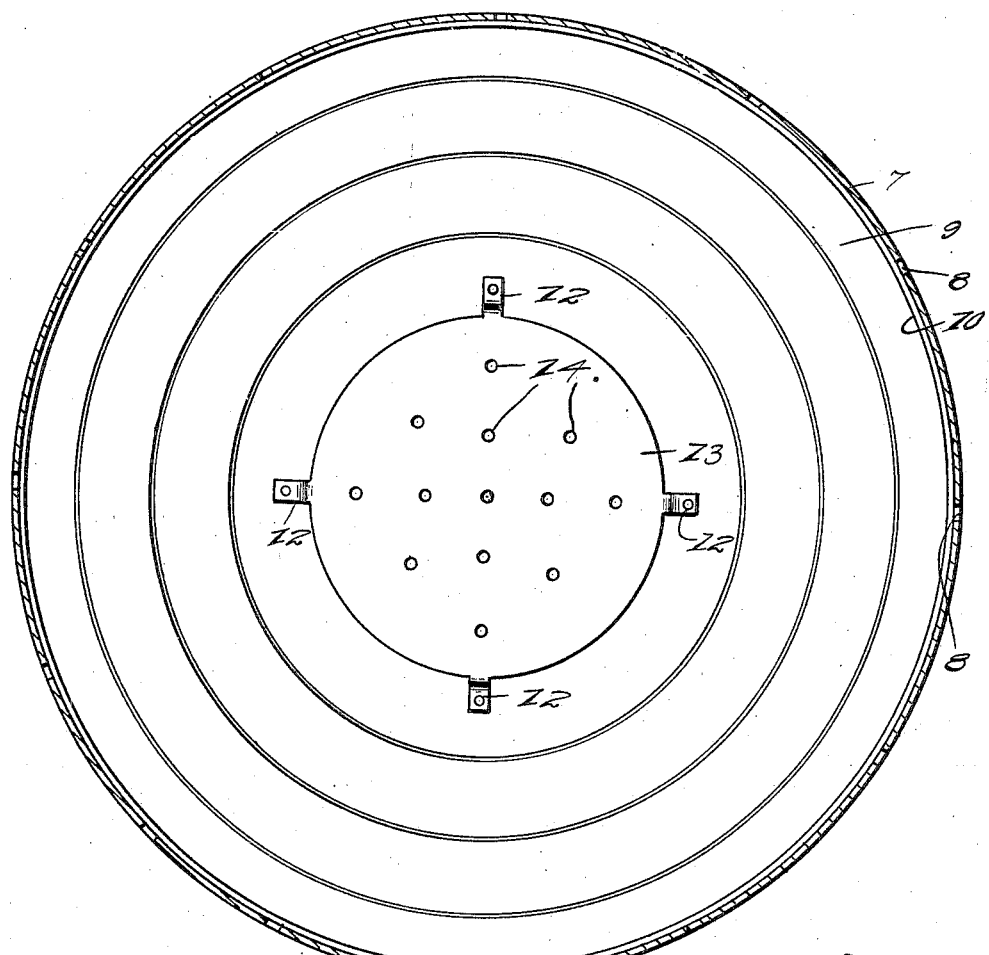

With this and other objects in view, the invention consists in the novel construction, combination and arrangement of parts as will be hereinafter specifically described, claimed and illustrated in the accompanying drawing, in which:

Figure 1 represents a diametrical sectional view through the improved freezing attachment, and Fig. 2 represents a transverse sectional view on the line 2—2 of Fig. 1.

Referring to the drawing in detail, wherein similar reference numerals designate corresponding parts throughout the several views, the numeral 5 indicates an inverted frusto-conical base plate having connection with a solid stem 6 and provided at its outer edge with an upstanding and internally threaded flange 7, having a series of outlet ports 8 therein.

A top plate for supporting the specimen to be frozen is provided with a depending annular flange 10, having external screw threads removably fitted in the internally screw threaded flange 7 of the base plate 5. The top plate 9 is formed with a series of annular concentric depressions 11 defining grooves or channels in the top surface thereof designed to assist in maintaining the specimen in position thereon. The plates 5 and 9 and the flange 7 form a chamber into which the freezing medium is directed during the use of the device.

Angular extensions 12 are formed upon an inverted conical diffuser 13 and are secured to the under side of the top plate 9 adjacent the center thereof, and support the diffuser 13, which latter is of considerably less diameter than the base plate 5 and top plate 9, and is provided with a series of perforations 14 therein.

An inlet pipe 15 is secured in the stem 6 and communicates with an angular passage 16 formed therein by which the freezing gas is conducted against the apex of the diffuser 13. The diffuser, owing to its perforations and to the spacing of its peripheral edge from the top plate, permits a small portion of the freezing medium to engage the center of the top plate. The rest of the freezing medium is directed by the diffuser into engagement with the outer portion of the top plate. The ratio between the respective portions of the freezing medium is such as to bring about a rapid lowering of the temperature of the top plate uniformly throughout its entire area. A specimen placed upon the top plate would be rapidly and uniformly frozen, and would as the result thereof be of equal consistency throughout.

What I claim is:

1. A freezing attachment for microtomes comprising a chamber having a top plate of considerable area and provided with exhaust ports, an inverted conical diffuser located within said chamber and having its peripheral edge spaced from the under side of said top plate and provided with perforations, and a freezing medium supply pipe discharging into the chamber at the apex of said diffuser, the spacing of the upper edge of the diffuser from the top plate and the perforations in the diffuser causing such a uniform distribution of the freezing medium within the chamber as to bring about a rapid lowering of the temperature of said top plate uniformly throughout its entire area.

2. A freezing attachment for microtomes comprising a chamber having a top plate of considerable area and provided with exhaust ports, a freezing medium supply pipe discharging into said chamber, and a diffuser located within the chamber and adapted to permit a small portion of the freezing medium to engage the center of the top plate and adapted to direct the rest of the freezing medium for engagement with the outer portion of the top plate, the ratio between the respective portions of the freezing medium being such as to bring about a rapid lowering of the temperature of the top plate uniformly throughout its entire area.

In testimony whereof I affix my signature in presence of two witnesses.

HAROLD I. GOSLINE.

Witnesses:
 DAVID GOLDSTEIN,
 ELIZABETH G. HOLLAND.